United States Patent Office 3,480,598
Patented Nov. 25, 1969

3,480,598
ORGANIC POLYMERIC MATERIALS
Eric Nield, Ware, England, assignor to Imperial Chemical Industries Limited, London, England, a corporation of Great Britain
No Drawing. Continuation of application Ser. No. 463,869, June 14, 1965. This application Oct. 16, 1968, Ser. No. 781,673
Claims priority, application Great Britain, June 25, 1964, 26,347/64
Int. Cl. C08f *19/10*
U.S. Cl. 260—78.5        11 Claims

ABSTRACT OF THE DISCLOSURE

A polymeric product of an alkyl methacrylate in which the alkyl group contains not more than four carbon atoms, α-methyl styrene and maleic anhydride, maleimide and/or its N-substituted derivative, the product containing from 45 to 99% by weight of alkyl methacrylate units, and from 55 to 1% by weight of α-methyl styrene units and maleic anhydride, maleimide and/or its N-substituted derivative taken together, the latter units being in the proportion of 0.05 to 2 moles per mole of said α-methyl styrene units.

---

This application is a continuation of application Ser. No. 463,869, filed June 14, 1965, and now abandoned.

The present invention relates to new organic polymeric materials which are copolymers of methyl methacrylate, and to their process of production.

Polymethyl methacrylate is an organic polymeric material of considerable commercial value. It has great utility and is widely used for many different applications. It is a thermoplastic material which means that it softens and can be shaped or moulded when heated to high temperatures. For some purposes it would be an advantage if a polymer having all the useful properties of polymethyl methacrylate but having a higher softening point could be produced. It has been proposed to make certain copolymers of methyl methacrylate and α-methyl styrene to achieve this end, but the production of such copolymers is made difficult by the slow rate of polymerisation of α-methyl styrene and the consequent difficulty of avoiding heterogeneity in the products.

An object of this invention is the provision of copolymers of methyl methacrylate and α-methyl styrene which can be made by a relatively rapid process.

According to the present invention we provide a polymeric product of an alkyl methacrylate in which the alkyl group contains not more than four carbon atoms, α-methyl styrene and at least one polymerisable monomer that is more electron deficient than the, or any, alkyl methacrylate used in the preparation of the product, the product containing from 45 to 99% by weight of alkyl methacrylate units, and from 55 to 1% by weight of α-methyl styrene units and units of said electron deficient monomer taken together, said electron deficient monomer units being in the proportion of 0.05 to 2 moles per mole of said α-methyl styrene units. In general we prefer that the electron deficient monomer units should be not in an amount greater than one mole per mole of α-methyl styrene.

Further in accordance with our invention we provide a process for the production of polymeric products in which a mixture of monomers is polymerised, said mixture consisting essentially of 45 to 99% by weight of the mixture of one or more alkyl methacrylates in which the alkyl group contains not more than four carbon atoms, and from 55 to 1% by weight of said mixture of α-methyl styrene and one or more monomers more electron deficient than the, or any, alkyl methacrylate present in the mixture, said electron deficient monomer or monomers being in the proportion of 0.05 to 2 moles per mole of said α-methyl styrene. In general we prefer that the electron deficient monomer should be in an amount not greater than one mole per mole of α-methyl styrene.

We prefer that the alkyl methacrylate should be methyl methacrylate because polymeric products based on methyl methacrylate have the greatest utility as regards hardness and general suitability for making moulded products.

We prefer that the alkyl methacrylate units form from 55 to 95% by weight of our polymeric product because these proportions cover the most generally useful part of our range of products. More particularly we prefer that the alkyl methacrylate units should form from 60 to 90% by weight of the product because within this range products have properties usually associated with polymethyl methacrylate. With less than 60% of methyl methacrylate the polymers tend to be brittle, and with greater than 95% of methyl methacrylate an effective increase in the softening point may not be achieved.

In order to determine whether a monomer is more electron deficient than the alkyl methacrylate, reference may be made to Journal of Polymer Science, volume 54, 1961, pp. 411–455, particularly p. 444. The monomers listed are characterised by a factor $e$ which is a copolymerisation parameter which depends upon the polar properties of the monomer. Accordingly electron deficient monomers which may be used in our invention are those which have a greater positive value of $e$ than the value for the alkyl methacrylate. We prefer that the value of $e$ for the electron deficient monomer should be appreciably greater than the value for the alkyl methacrylate. In the case of methyl methacrylate this value is 0.40, and with this monomer we prefer to use electron deficient monomers having a value of $e$ greater than 0.8.

Where it is required that our polymeric products should have softening points greater than that of polymethyl methacrylate it is generally necessary that the electron deficient monomer should be capable (actually or theoretically) of forming a homopolymer that has a softening point substantially the same as, or greater than that of polymethyl methacrylate. Examples of such monomers are maleimide and its N-substituted derivatives, maleic anhydride, and methylene malonic esters.

Examples of other monomers that may be used in our invention but which do not necessarily yield polymeric products having softening points greater than that of polymethyl methacrylate include methyl acrylate, methacrylic acid, acrylic acid, n-octyl acrylate, butyl acrylate, vinyl trifluoroacetate, acrylamide, diethyl fumarate and dimethyl fumarate.

It will be appreciated that our copolymers can include a small amount of a monomer which is less electron deficient than methyl methacrylate in order to obtain some additional advantageous effect whether or not accompanied by an improvement in the softening point provided that the advantages of the presence of the α-methyl styrene and the electron deficient monomer are not substantially reduced.

Our copolymers may be blended with normal ancillary ingredients, e.g. dyestuffs, pigments, plasticisers, stabilisers, fillers and other polymeric material. Rubber-like polymeric materials may usefully be added to increase the impact resistance of our copolymers.

Our invention is illustrated but in no way limited by the following examples in which all parts are by weight.

Example 1

A solution of methyl methacrylate (70 parts), α-methyl styrene (20 parts) and N-o-chlorophenyl maleimide (10 parts) was emulsified in water (150 parts) containing sodium lauryl sulphate (0.15 part) and potassium persulphate (0.38 part). The mixture was heated to 80° C. (reflux) and held there; after 50 minutes the temperature rose spontaneously to 89° C. On raising the temperature to 100° C. only very small quantities of α-methyl styrene were stripped off, showing that polymerisation was substantially complete.

A similar polymerisation using no aryl maleimide took four hours to reach 90% polymerisation and no spontaneous temperature rise was noted.

Example 2

The following mixture was prepared and warmed gently to form a syrup:

| | Parts |
|---|---|
| Maleic anhydride | 11 |
| α-Methyl styrene | 14 |
| Methyl methacrylate | 22.5 |
| Benzoyl peroxide | 0.25 |

The syrup thus obtained was poured into a cell formed by two parallel flat sheets of glass spaced apart by means of a flexible peripheral gasket a distance of ⅛ inch. The filled cell was maintained at 65–70° C. for 17 hours and then at 110° C. for two hours. The glass plates were then separated from the sheet of solid polymer formed by this process which was colourless and transparent and had a Vicat softening point of 119° C. and a reduced viscosity of 1.43 measured as a 0.5% solution in chloroform at 25° C.

For comparative purposes this example was repeated as before but omitting the maleic anhydride and using 23.6 parts of methyl methacrylate in place of the 22.5 parts. It was not possible to form a syrup before filling the cell, and at the end of the process the contents of the cell were in the form of a syrup and no solid polymer was formed.

Example 3

The following mixture was prepared and warmed gently to form a syrup:

| | Parts |
|---|---|
| Maleimide | 11 |
| α-Methyl styrene | 14 |
| Methyl methacrylate | 22.5 |
| Benzoyl peroxide | 0.25 |

A cell was prepared and filled and heated exactly as described in Example 2. A solid sheet of polymer was obtained that was transparent and colourless, had a Vicat softening point of 129° C. and a reduced viscosity of 1.5 measured as a 0.5% solution in chloroform at 25° C.

Example 4

| | Parts |
|---|---|
| Water | 100 |
| Ethylene/maleic anhydride copolymer | 0.03 |
| Sodium dihydrogen phosphate | 3 | were placed in a five litre autoclave which was then purged with nitrogen, and 100 parts of polymerisable monomers and 0.02 part of azodicyclohexanecarbonitrile added. The 100 parts of polymerisable monomers were made up from varying amounts of methyl methacrylate, α-methyl styrene and N-orthochlorophenylmaleimide. The polymerisation time for each composition was measured and is recorded in Table 1.

TABLE 1

| Polymerisable monomers | | | | |
|---|---|---|---|---|
| Methyl Methacrylate (parts) | α-Methyl stryrene (parts) | N-orthochlorophenylmaleimide (parts) | Polymerisation temperature (° C.) | Polymerisation time (min.) |
| 82.5 | 7.5 | 10 | 105 | 150 |
| 82.5 | 10 | 7.5 | 105 | 180 |
| 85.0 | 6 | 9 | 105 | 95 |
| 90.0 | 10 | 0 | 105 | >300 |
| 95.0 | 5 | 0 | 105 | >300 |
| 97.5 | 2.5 | 0 | 80 | 200 |

From Table 1 we see that the copolymerisation rate of methyl methacrylate and α-methyl styrene is substantially increased by the presence of N-orthochlorophenylmaleimide which is more electron deficient than methyl methacrylate.

Example 5

Similar experiments to that of Example 5 were carried out using maleimide or maleic anhydride in place of the N-orthochlorophenylmaleimide. The polymerisation times for these compositions are shown below.

TABLE 2

| Monomers | | | | |
|---|---|---|---|---|
| Methyl methacrylate (parts) | α-Methyl styrene (parts) | Electron deficient monomer | Polymerisation temperature (° C.) | Polymerisation time (min.) |
| 90 | 5 | 5 parts malemide. | 100 | 120 |
| 90 | 5 | 5 parts maleic anhydride. | 100 | 150 |
| 90 | 10 | 0 part | 105 | >300 |

Again we see that the polymerisation time is substantially reduced by the addition of maleimide or maleic anhydride, both of which are more electron deficient than methyl methacrylate.

I claim:

1. A polymeric product of methyl methacrylate, α-methyl styrene and at least one polymerizable monomer that is more electron deficient than methyl methacrylate and selected from the group consisting of maleic anhydride and maleimide and its N-substituted derivatives, the product containing from 45 to 99% by weight of methyl methacrylate units, and from 55 to 1% by weight of α-methyl styrene units and units of said electron deficient monomer taken together, said electron deficient monomer units being in the proportion of 0.05 to 2 moles per mole of said α-methyl styrene units.

2. A polymeric product according to claim 1 in which the electron deficient monomer units are present in an amount less than one mole per mole of α-methyl styrene.

3. A polymeric product according to claim 1 in which the methyl methacrylate units form from 60 to 90% by weight of the product.

4. A polymeric product according to claim 1 in which the electron deficient monomer is capable of forming a homopolymer that has a softening point substantially the same as or greater than that of polymethyl methacrylate.

5. A process for the production of polymeric products according to claim 1 in which a mixture of monomers is polymerized, said mixture consisting essentially of from 45 to 99% by weight of the mixture of methyl methacrylate, and from 55 to 1% by weight of said mixture of α-methyl styrene and one or more monomers more electron deficient than methyl methacrylate and selected from the group consisting of maleic anhydride and maleimide and its N-substituted derivatives, said electron deficient monomer or monomers being in the proportion of 0.05 to 2 moles per mole of said α-methyl styrene.

6. A polymeric product as set forth in claim 1 in which said electron deficient monomer is maleic anhydride.

7. A polymeric product as set forth in claim 1 in which said electron deficient monomer is maleimide.

8. A polymeric product as set forth in claim 1 in which said electron deficient monomer is N-orthochlorophenyl maleimide.

9. A process as set forth in claim 5 in which said electron deficient monomer is maleic anhydride.

10. A process as set forth in claim 5 in which said electron deficient monomer is maleimide.

11. A process as set forth in claim 5 in which said electron deficient monomer is N-orthochloromaleimide.

References Cited

UNITED STATES PATENTS 2,974,125   3/1961   Lang et al. _____ 260—85.5

JOSEPH L. SCHOFER, Primary Examiner

J. KNIGHT, Assistant Examiner

U.S. Cl. X.R.

260—72, 78, 80, 80.6, 80.8, 80.81, 86.1, 86.7